(12) United States Patent
Takemoto

(10) Patent No.: US 6,488,751 B1
(45) Date of Patent: Dec. 3, 2002

(54) INK SET FOR INK JET RECORDING AND INK JET RECORDING METHOD

(75) Inventor: Kiyohiko Takemoto, Nagano (JP)

(73) Assignee: Seiko Epson Corporation, Tokyo To (JP)

(*) Notice: Subject to any disclaimer, the term of this patent is extended or adjusted under 35 U.S.C. 154(b) by 0 days.

(21) Appl. No.: 09/413,516

(22) Filed: Oct. 6, 1999

(30) Foreign Application Priority Data

Oct. 8, 1998 (JP) .............................. 10-287092

(51) Int. Cl.⁷ ................................ C09D 11/02
(52) U.S. Cl. ................ 106/31.13; 106/31.27; 106/31.6
(58) Field of Search ................ 106/31.13, 31.27, 106/31.6; 347/100

(56) References Cited

U.S. PATENT DOCUMENTS

| | | | | |
|---|---|---|---|---|
| 5,846,306 A | * | 12/1998 | Kubota et al. | 106/31.6 |
| 5,858,075 A | * | 1/1999 | Deardurff et al. | 106/31.27 |
| 5,888,284 A | * | 3/1999 | Engel | 106/31.27 |
| 5,948,154 A | * | 9/1999 | Hayashi et al. | 106/31.58 |
| 5,980,622 A | * | 11/1999 | Byers | 106/31.57 |
| 6,030,441 A | * | 2/2000 | Kubota et al. | 106/31.75 |
| 6,077,338 A | * | 6/2000 | Wallstrom | 106/31.6 |
| 6,120,589 A | * | 9/2000 | Bannai et al. | 106/31.27 |

FOREIGN PATENT DOCUMENTS

| | | |
|---|---|---|
| JP | 3-56573 | 3/1991 |
| JP | 3-79678 | 4/1991 |
| JP | 3-160068 | 7/1991 |
| JP | 4-18467 | 1/1992 |

OTHER PUBLICATIONS

JPO Abstract 03(1991)–56573, Mar. 12, 1991.
JPO Abstract 03(1991)–79678, Apr. 4, 1991.
JPO Abstract 03(1991)–160068, Jul. 10, 1991.
JPO Abstract 04(1992)–18467, Jan. 22, 1992.

* cited by examiner

Primary Examiner—Helene Klemanski
(74) Attorney, Agent, or Firm—Ladas & Parry

(57) ABSTRACT

Disclosed are an ink set for ink jet recording which can realize images having excellent lightfastness, and an ink jet recording method using the same. The ink set for ink jet recording comprises two or more inks, the order from highest to lowest of fading of the inks being in the order from highest to lowest of lightness of the inks.

18 Claims, No Drawings

INK SET FOR INK JET RECORDING AND INK JET RECORDING METHOD

BACKGROUND OF THE INVENTION

1. Field of the Invention

The present invention relates to an ink set for ink jet recording which can realize images having excellent lightfastness, and an ink jet recording method using the same.

2. Background Art

Fading of color images with the elapse of time sometimes makes the color images different from the original one. One conventional method for rendering the change in images unnoticeable is to use inks having substantially the same fading rate. This is based on a thought that, since the inks fade on substantially the same level, the printed inks constituting the printed color image would fade on substantially the same level. This makes it difficult to notice the fading of the whole color image.

On the other hand, in general, many properties are required of colorants used in inks for ink jet printers. For example, dissolution or dispersion in solvents is necessary for stable ejection from the ink jet recording head and prevention of clogging. Additional properties required of the colorants include that the colorants do not deteriorate head members and fixation onto recording sheets and color development are good. In addition, safety and the like are required. The above various restrictions unfavorably limit colorants usable in inks for ink jet recording. Therefore, it is very difficult to use color inks having the same fading rate.

SUMMARY OF THE INVENTION

The present inventors have now found that, even though the inks used with ink jet printers do not have identical fading, use of a combination of the inks that have a difference in fading in the order of lightness of the inks renders the fading of a color image visually unnoticeable. Further, the present inventors have found that deposition of the inks in the order from highest to lowest of fading onto recording media can more effectively enjoy the above advantage. The present invention has been made based on such finding.

Thus, according to one aspect of the present invention, there is provided an ink set for ink jet recording, comprising two or more inks, the order from highest to lowest of fading of the inks being in the order from highest to lowest of lightness of the inks.

According to another aspect of the present invention, there is provided an ink jet recording method comprising the steps of: ejecting droplets of inks; and depositing the droplets onto a recording medium to perform printing, the inks being inks constituting the ink set according to the present invention. According to a preferred embodiment of the present invention, the inks are deposited in the order from highest to lowest of fading onto the recording medium.

Color images formed by the ink set according to the present invention, even when faded with the elapse of time, cannot visually notice the fading without difficulty. Therefore, the lightfastness of the printed images can be apparently improved. This advantage is significant in recording using ink jet printers wherein ink droplets are deposited directly onto recording media, and is more significant in ink systems using dispersed pigments.

DESCRIPTION OF THE PREFERRED EMBODIMENTS

Ink Set

The ink set according to the present invention comprises a combination of two or more inks selected so that the order from highest to lowest of fading of the inks is in the order from highest to lowest of lightness of the inks. Therefore, for example, if assume that inks A, B, and C respectively having lightnesses La, Lb, and Lc (La>Lb>Lc) are present and these are combined to constitute an ink set according to the present invention, the fading of the ink A (Fa), the fading of the ink B (Fb), and the fading of the ink C (Fc) should satisfy the following relationship: Fa>Fb>Fc.

The ink set according to the present invention preferably comprises at least a yellow ink, a magenta ink, and a cyan ink. When the order from highest to lowest of lightness of the inks contained in this ink set is the yellow ink, the magenta ink, and the cyan ink, the fading of the yellow ink (Y), the fading of the magenta ink (M), and the fading of the cyan ink (C) should satisfy the following relationship: Y>M>C. That is, the order from largest to smallest of the fading should be the yellow ink, the magenta ink, and the cyan ink.

When the ink set according to the present invention further contains a black ink in addition to the yellow ink, the magenta ink, and the cyan ink, and, in this case, when the order from highest to lowest of lightness of the inks contained in this ink set is the yellow ink, the magenta ink, the cyan ink, and the black ink, the fading of the light black ink (K), the fading of the yellow ink (Y), the fading of the magenta ink (M), and the fading of the cyan ink (C) should satisfy the following relationship: Y>M>C>K.

When the ink set according to the present invention comprises a light magenta ink and/or a light cyan ink in addition to the yellow ink, the magenta ink, and the cyan ink, and, in this case, when the order from highest to lowest of lightness of the inks contained in this ink set is the yellow ink, the light magenta ink, the light cyan ink, the magenta ink, and the cyan ink, the fading of the yellow ink (Y), the fading of the light magenta ink (Lm), the fading of the light cyan ink (Lc), the fading of the magenta ink (M), and the fading of the cyan ink (C) should satisfy the following relationship: Y>Lm>Lc>M>C.

When the ink set according to the present invention further contains a black ink in addition to the yellow ink, the light magenta ink, the light cyan ink, the magenta ink, the cyan ink, and the black ink, and, in this case, when the order from highest to lowest of lightness of the inks contained in this ink set is the yellow ink, the light magenta ink, the light cyan ink, the magenta ink, the cyan ink, and the black ink, the fading of the black ink (K), the fading of the yellow ink (Y), the fading of the light magenta ink (Lm), the fading of the light cyan ink (Lc), the fading of the magenta ink (M), and the fading of the cyan ink (C) should satisfy the following relationship: Y>Lm>Lc>M>C>K.

The "light magenta" refers to pale magenta, and the "light cyan" refers to pale cyan. The light magenta ink used in the present invention may be easily produced by a conventional method, for example, by reducing the content of a colorant (a pigment or a dye) used in the preparation of a magenta ink, or, in the case of a pigment ink, by reducing the particle diameter of the pigment used. Likewise, the light cyan ink used in the present invention may be easily produced by a conventional method, for example, by reducing the content of a colorant (a pigment or a dye) used in the preparation of a cyan ink, or, in the case of a pigment ink, by reducing the particle diameter of the pigment used.

When the ink set according to the present invention comprises an orange ink and/or a green ink in addition to the yellow ink, the magenta ink, and the cyan ink, and, in this case, when the order from highest to lowest of lightness of the inks contained in this ink set is the yellow ink, the orange ink, the magenta ink, the cyan ink, and the green ink, the fading of the yellow ink (Y), the fading of the orange ink (O), the fading of the magenta ink (M), the fading of the cyan ink (C), and the fading of the green ink (G) should satisfy the following relationship: Y>O>M>C>G.

When the ink set according to the present invention further contains a black ink in addition to the yellow ink, the magenta ink, the cyan ink, the orange ink, and the green ink, and, in this case, when the order from highest to lowest of lightness of the inks contained in this ink set is the yellow ink, the orange ink, the magenta ink, the cyan ink, the green ink, and the black ink, the fading of the black ink (K), the fading of the yellow ink (Y), the fading of the orange ink (O), the fading of the magenta ink (M), the fading of the cyan ink (C), and fading of the green ink (G) should satisfy the following relationship: Y>O>M>C>G>K.

The term "lightness" used herein refers to the L* value in the L*a*b* color system specified in CIE (Commission International de l'Eclairage).

Further, the term "fading (F)" used herein is a value obtained by formula (I):

$$F(\%) = (Di - De)/Di \times 100 \qquad (I)$$

wherein Di represents the reflection density as measured in an early stage of printing and De represents the reflection density after a lightfastness test. The reflection density of the ink may be measured with any conventional spectrophotometer. The lightfastness may also be determined by any conventional testing method.

According to the present invention, the fading of each ink may be regulated by properly selecting the kind of the colorant (pigment or dye) used.

According to a preferred embodiment of the present invention, the ink is preferably a pigment-based ink using a pigment as the colorant.

In the case of the pigment-based ink, the fading of the ink may be regulated by varying the particle diameter of the pigment used; Specifically, reducing the particle diameter of the pigment can increase the fading of the ink containing the pigment, and thus the fading may be regulated by properly regulating the particle diameter. According to the present invention, the particle diameter of the pigment may be expressed in terms of the accumulative average diameter as an index. The cumulative average diameter refers to such a diameter that corresponds to 50% of a cumulative curve on particle diameter prepared with the total volume of a population of an object powder being presumed to be 100%. The cumulative average diameter is also known as "center diameter" or "media diameter," and is in many cases used as the average particle diameter of a dispersion of fine particles, such as a pigment dispersion.

According to the present invention, the colorant may be any colorant, that is, an inorganic dye and/or an organic dye, or preferably an organic pigment and/or an organic pigment, so far as the fading requirement is satisfied. As described above, however, utilization of pigments is preferred. Inorganic pigments usable herein include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a particularly preferred embodiment of the present invention, the yellow pigment is C.I. Pigment Yellow 74, 109, 110, or 138, the magenta pigment is C.I. Pigment Red 122, 202, or 209, the cyan pigment is C.I. Pigment Blue 15:3 or 60, the black pigment is C.I. Pigment Black 7, the orange pigment is C.I. Pigment Orange 36 or 43, and the green pigment is C.I. Pigment Green 7 or 36. According to the present invention, among these pigments, use of pigments having good affinity for water is preferred.

The particle diameter of the pigment is preferably 0.15 to 0.25 $\mu$m, more preferably 0.15 to 0.2 $\mu$m, in terms of the cumulative average diameter.

The present invention will be described with reference to an embodiment using pigment-based inks. The following description is tree of dye-based inks unless otherwise specified.

According to the present invention, the pigment is preferably added as a pigment dispersion obtained by dispersing a pigment with the aid of a dispersant. Preferred dispersants include conventional dispersants commonly used in the preparation of conventional pigments dispersions, for example, polymeric dispersants, or surfactants.

Examples of polymeric dispersants usable herein include naturally occurring polymeric compounds, and specific examples thereof include: proteins, such as glue, gelatin, casein, and albumin; naturally occurring rubbers, such as gum arabic and tragacanth; glucosides, such as sponging; alginic acid and alginic acid derivatives, such as propylene glycol alginate, triethanolamine alginate, and ammonium alginate; and cellulose derivatives, Such as methyl cellulose, carboxymethyl cellulose, hydroxyethyl cellulose, and ethylhydroxyethyl cellulose.

Synthetic polymeric compounds may also be used as the polymeric dispersant. Synthetic polymeric compounds usable herein include, for example, polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer; styrene/acrylic resins, such as styrene/acrylic acid copolymer, styrene/methacrylic acid copolymer, styrene/methacrylic acid/alkyl acrylate copolymer, styrene/α-methylstyrene/acrylic acid copolymer, and styrene/α-methylstyrene/acrylic acid/alkyl acrylate copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers.

Among them, a copolymer of a monomer having a hydrophobic group with a monomer having a hydrophilic group and a polymer of a monomer having both a hydrophobic group and a hydrophilic group in its molecular structure are particularly preferred.

Examples of salts of the above polymers include salts of the above polymers with diethylamine, ammonia, ethylamine, triethylamine, propylamine, isopropylamine, dipropylamine, butylamine, isobutylamine, triethanolamine, diethanolamine, aminomethylpropanol, morpholine or the like. The weight average molecular weight of these copolymers is preferably 3,000 to 30,000, more preferably 5,000 to 15,000.

Examples of preferred surfactants as the dispersant include: anionic surfactants, such as salts of fatty acids, salts of higher alkyldicarboxylic acids, salts of higher alcohol sulfates, salts of higher alkylsulfonic acids, condensates of higher fatty acids with amino acids, salts of sulfosuccinic ester, salts of naphthenic acid, salts of liquid fatty oil sulfuric esters, and salts of alkylallylsulfonic acids; cationic surfactants, such as fatty acid amine salts, quaternary ammonium salts, sulfonium salts, and phosphonium salts; and nonionic surfactants, such as polyoxyethylene alkyl ethers, polyoxyethylene alkyl esters, sorbitan alkyl esters, and polyoxyethylene sorbitan alkyl esters.

The amount of the dispersant added is preferably 0.06 to 3 parts by weight, more preferably 0.125 to 3 parts by weight, based on one part by weight of the pigment.

According to a preferred embodiment of the present invention, the inks used in the present invention further contain a wetting agent. Preferred wetting agents include diethylene glycol, polyethylene glycol, polypropylene glycol, ethylene glycol, propylene glycol, butylene glycol, triethylene glycol, 1,2,6-hexanetriol, thioglycol, hexylene glycol, glycerin, trimethylolethane, trimethylolpropane, urea, 2-pyrrolidone, N-methyl-2-pyrrolidone, and 1,3-dimethyl-2-imidazolidinone. Those having an ethylene oxide group are preferred with diethylene glycol being most preferred.

Addition of low-boiling organic solvents in addition to these wetting agents is preferred. Examples of preferred low-boiling organic solvents include methanol, ethanol, n-propanol, iso-propanol, n-butanol, sec-butanol, tert-butanol, iso-butanol, n-pentanol, ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether. Among them, monohydric alcohols are particularly preferred.

The amount of the wetting agent added is generally 0.5 to 40% by weight, preferably 2 to 20% by weight, based on the ink. The amount of the low-boiling organic solvent added is generally 0.5 to 10% by weight, preferably 1.5 to 6% by weight, based on the ink.

According to a preferred embodiment of the present invention, the inks used in the present invention may contain a surfactant. Examples of preferred surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycol [OLFINE Y and Surfynol 82, 104, 440, 465, 485, and TG (all the above products being manufactured by Air Products and Chemicals Inc.)] may also used.

The inks used in the present invention may contain a saccharide. Examples of saccharides usable herein include monosaccharide, disaccharides, oligosaccharides (including trisaccharides and tetrasaccharides), and other polysaccharides, preferably glucose, mannose, fructose, ribose, xylose, arabinose, galactose, aldonic acid, glucitol, sorbit, maltose, cellobiose, lactose, sucrose, trehalose, and maltotriose. Saccharides noted above include alginic acid, α-cyclodextrin, and cellulose.

Derivatives of these saccharides usable herein include reducing sugars of the above saccharides, for example, sugar alcohols, oxidizing sugars (for example, aldonic acid or uronic acid), amino acids, and thiosugars. Among them, sugar alcohols are particularly preferred, and specific examples thereof include maltitol and sorbit.

The content of the saccharide is preferably 0.1 to 40% by weight, more preferably 0.5 to 30% by weight, based on the ink.

The inks used in the present invention may contain a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin, and styrene resin.

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by mixing resin particles, optionally together with a surfactant, in water. For example, an emulsion of an acrylic resin or a styrene/(meth) acrylic resin may be prepared by mixing an ester of (meth) acrylic acid or alternatively styrene in combination with an ester of (meth)acrylic acid, optionally together with an (meth)acrylic acid, in water in the presence of a surfactant. In general, the mixing ratio of the resin component to the surfactant is preferably about 10:1 to 5:1. When the amount of the surfactant used is less than the lower limit of the above amount range, it is difficult to obtain an emulsion. On the other hand, when the amount of the surfactant used exceeds the upper limit of the above amount range, disadvantageously, there is a tendency that the waterfastness of the ink is deteriorated, or otherwise the penetration is deteriorated.

The surfactant is not particularly limited. Preferred examples thereof include: anionic surfactants for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more.

The ratio of the resin as the component constituting the dispersed phase to water is suitably 60 to 400 parts by weight of water based on 100 parts by weight of the resin, preferably 100 to 200 parts by weight of water based on 100 parts by weight of the resin.

Known resin emulsions may also be used as the above resin emulsion. For example, resin emulsions described in Japanese Patent Publication No. 1426/1987and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-1002 and E-5002 (emulsion of styrene/acrylic resin, manufactured by Nippon Paint Co., Ltd.), Voncoat 4001 (emulsion of acrylic resin, manufactured by Dainippon Ink and Chemicals, Inc.), Voncoat 5454 (emulsion of styrene/acrylic resin, manufactured by Dainippon Ink and Chemicals, Inc.), SAE-1014 (emulsion of styrene/acrylic resin, manufactured by Nippon Zeon Co., Ltd.), and Saivinol SK-200 (emulsion of acrylic resin, manufactured by Saiden Chemical Industry Co., Ltd).

If necessary, pH adjustors, preservatives and/or antimolds and the like may be added to the inks used in the present invention.

The inks used in the present invention may be produced by dispersing and mixing the above ingredients using a suitable method. Preferably, the ingredients except for the organic solvent and volatile ingredients are mixed together in a suitable dispergator (for example, a ball mill, a sand mill, an attrittor, a roll mill, an agitator mill, a Henschel mixer, a colloid mill, an ultrasonic homogenizer, a jet mill, or an angmill) to prepare a homogeneous composition, and the organic solvent and the volatile ingredients are then added to the composition. Thereafter, preferably, the ink composition is filtered, preferably by filtration under reduced pressure or pressure filtration using a metallic filter, a membrane filter or the like, or centrifuged to remove coarse particles and foreign matter causative of nozzle clogging.

Ink Jet Recording Method

According to the ink jet recording method of the present invention, inks constituting the ink set of the present invention are used. According to the ink jet recording method of the present invention, preferably, the inks are deposited in the order from highest to lowest of fading of the inks onto a recording medium.

For example, when the ink jet recording method according to the present invention is carried out using at least a yellow ink, a magenta ink, and a cyan ink, it is preferred to select such a combination of inks that the order from highest to lowest of lightness of the inks is the yellow ink, the magenta ink, and the cyan ink and the fading of the yellow ink (Y), the fading of the magenta ink (M), and the fading of the cyan ink (C) satisfy the following relationship: Y>M>C. In this case, preferably, printing is carried out in such a manner that the yellow ink is first ejected, the magenta ink is then ejected, and, finally, the cyan ink is ejected.

Further, when the ink jet recording method of the present invention is carried out, for example, using the yellow ink, the magenta ink, and/or the cyan ink in combination with at least one ink selected from a light magenta ink, a light cyan ink, and a black ink, it is preferred to select such a combination of inks that the order from highest to lowest of lightness of the inks is the yellow ink, the light magenta ink, the light cyan ink, the magenta ink, the cyan ink, and the black ink and, in this case, the fading of the yellow ink (Y), the fading of the light magenta ink (Lm), the fading of the light cyan ink (Lc), the fading of the magenta ink (M), the fading of the cyan ink (C), and the fading of the black ink (K) satisfy the following relationship: Y>Lm>Lc>R>C>K. In this case, preferably, the inks are ejected in the order from highest to lowest of fading of the inks onto the recording medium.

Further, the ink jet recording method of the present invention is carried out, for example, using the yellow ink, the magenta ink, and/or the cyan ink in combination with at least one ink selected from an orange ink, a green ink, and a black ink, it is preferred to select such a combination of inks that the order from highest to lowest of lightness of the inks is the yellow ink, the orange ink, the magenta ink, the cyan ink, the green ink, and the black ink and, in this case, the fading of the yellow ink (Y), the fading of the orange ink (O), the fading of the magenta ink (M), the fading of the cyan ink (C), and the fading of the green ink (G), and the fading of the black ink (K) satisfy the following relationship: Y>O>M>C>G>K. In this case, preferably, the inks are ejected in the order highest to lowest of fading of the inks onto the recording medium.

In the images obtained by the method according to the present invention, the fading of the inks proceeds according to the above relational expression. However, it is substantially impossible or difficult to visually notice the difference in fading between the printed inks. Consequently, the fading of the whole color image can be made difficult to visually notice. According to the method of the present invention, the lightfastness of the printed images can be apparently improved.

According to still another aspect of the present invention, there is provided an ink let recording head comprising nozzles arranged in the direction of movement of the recording head so that the inks are ejected in the order from highest to lowest of fading.

According to a further aspect of the present invention, there is provided an ink jet recording apparatus comprising the ink jet recording head.

According to still further aspect of the present invention, there is provided a recorded medium printed by the ink jet recording method.

EXAMPLES

The following examples further illustrate the present invention, but are not intended to limit it.

Inks were prepared according to the following formulations, and combined to prepare color ink sets.

Preparation of Color Ink Set 1

(a) The following three pigments were dispersed in the following respective amounts in the following liquid medium to prepare a color ink set 1.

| | |
|---|---|
| Pigment for cyan ink: | 2 wt % |
| C.I. Pigment Blue 15:3 | |
| Pigment for magenta ink: | 3 wt % |
| C.I. Pigment Red 122 | |
| Pigment for yellow ink: | 2 wt % |
| C.I. Pigment Yellow 74 | |

(b) A liquid medium having the following composition was used for the preparation of each ink.

| | |
|---|---|
| Styrene/acrylic acid copolymer (dispersant) | 0.5 wt % |
| Sucrose | 0.7 wt % |
| Maltitol | 6.3 wt % |
| Ethylene glycol | 15 wt % |
| Triethylene glycol monobutyl ether | 5 wt % |
| Disodium ethylenediaminetetraacetate (chelating agent) | 0.01 wt % |
| Preservative (Proxel-XLII, manufactured by ICI) | 0.3 wt % |
| Pure water | Balance |

Preparation of Blank Ink 1

A black ink 1 having the following composition was prepared.

| | |
|---|---|
| Carbon Black MA7 (manufactured by Mitsubishi Kasei Corp.) | 5 wt % |
| Styrene/acrylic acid copolymer (dispersant) | 1 wt % |
| Sucrose | 0.7 wt % |
| Maltitol | 6.3 wt % |
| Glycerin | 10 wt % |
| 2-Pyrrolidone | 2 wt % |
| Surfynol 465 | 0.5 wt % |
| Potassium hydroxide | 0.1 wt % |
| Disodium ethylenediaminetetraacetate (chelating agent) | 0.01 wt % |
| Preservative (Proxel-XLII, manufactured by ICI) | 0.3 wt % |
| Pure water | Balance |

Preparation of Color Ink Set 2

(a) The following two pigments were dispersed in the following respective amounts in the following liquid medium to prepare a color ink set 2.

| | |
|---|---|
| Pigment for light cyan ink: C.I. Pigment Blue 60 | 0.3 wt % |
| Pigment for light magenta ink: C.I. Pigment Red 209 | 0.4 wt % |

(b) A liquid medium having the following composition was used for the preparation of each ink.

| | |
|---|---|
| Styrene/acrylic acid copolymer (dispersant) | 0.5 wt % |
| Sucrose | 0.7 wt % |
| Maltitol | 6.3 wt % |
| Ethylene glycol | 15 wt % |
| Glycerin | 10 wt % |
| Surfynol 465 | 1 wt % |
| Triethylene glycol monobutyl ether | 3 wt % |
| Disodium ethylenediaminetetraacetate (chelating agent) | 0.01 wt % |
| Preservative (Proxel-XLII, manufactured by ICI) | 0.3 wt % |
| Pure water | Balance |

Preparation of Color Ink Set 3

(a) The following two pigments were dispersed in the following respective amounts in the following liquid medium to prepare a color ink set 3.

| | |
|---|---|
| Pigment for green ink: C.I. Pigment Blue 7 | 2 wt % |
| Pigment for orange ink: C.I. Pigment Orange 43 | 3 wt % |

(b) A liquid medium having the following composition was used for the preparation of each ink.

| | |
|---|---|
| Styrene/acrylic acid copolymer (dispersant) | 0.5 wt % |
| Sucrose | 0.7 wt % |
| Maltitol | 6.3 wt % |
| Ethylene glycol | 15 wt % |
| Surfynol 465 | 1 wt % |
| Triethylene glycol monobutyl ether | 3 wt % |
| Disodium ethylenediaminetetraacetate (chelating agent) | 0.01 wt % |
| Preservative (Proxel-XLII, manufactured by ICI) | 0.3 wt % |
| Pure water | Balance |

Preparation of Color Ink Set 4

(a) The following three pigments were dispersed in the following respective amounts in the following liquid medium to prepare a color ink set 4.

| | |
|---|---|
| Pigment for cyan ink: C.I. Pigment Blue 15:3 | 2 wt % |
| Pigment for magenta ink: C.I. Pigment Red 57:1 | 3 wt % |
| Pigment for yellow ink: C.I. Pigment Yellow 110 | 2 wt % |

(b) A liquid medium having the following composition was used for the preparation of each ink.

| | |
|---|---|
| Styrene/acrylic acid copolymer (dispersant) | 0.5 wt % |
| Sucrose | 0.7 wt % |
| Maltitol | 6.3 wt % |
| Ethylene glycol | 15 wt % |
| Triethylene glycol monobutyl ether | 5 wt % |
| Disodium ethylenediaminetetraacetate (chelating agent) | 0.01 wt % |
| Preservative (Proxel-XLII, manufactured by ICI) | 0.3 wt % |
| Pure water | Balance |

Regulation and Measurement of Cumulative Average Diameter

Each ink thus obtained was roll milled while controlling the dispersion time. The dispersion was filtered to remove coarse particles having a given particle diameter or more. Thus, inks having a predetermined cumulative average diameter described in the following examples and comparative examples were obtained. The cumulative average diameter was measured with a laser scattering type particle size distributing measuring device (Microtrack 9230 UPA, manufactured by Leeds & Northrup).

Measurement of Fading

For the inks constituting the ink sets used in the following examples and comparative examples, the fading was measured by a lightfastness test using a xenon weather-o-meter Ci35A (ATLAS). Specifically, exposure (300 kJ/m$^2$) was carried out for about 238 hr under conditions of black panel temperature 63° C., relative humidity 50%, and ultraviolet light (340 nm) irradiance 0.35 W/m$^2$.

The reflection density was measured with a spectrophotometer GRETAG SPM 50 (GRETAG) under conditions of light source D50, provision of no light source filter, absolute white as reference white, and angle of visibility 2°. The fading was calculated by equation (I):

$$F(\%) = (Di - De)/Di \times 100 \quad (I)$$

wherein F, Di, and De are as defined above

Measurement of Lightness

The lightness was measured with the same devices as used in the measurement of the reflection density.

Example 1

An ink jet printer MJ-510C (a printer used with inks of three colors of cyan, magenta, and yellow, manufactured by Seiko Epson Corporation) was provided. An image of a human being was printed on a specialty printing medium for ink jet recording (a specialty gloss film, manufactured by Seiko Epson Corporation) by means of this printer using the color ink set 1. For the inks constituting the color ink set 1, the cumulative average diameter of the pigment contained therein, the fading, and the lightness were as follows.

Cumulative Average Diameter:

Cyan pigment: 105 μm

Magenta pigment: 65 μm

Yellow pigment: 53 μm

The fading of the yellow ink (Y), the fading of the magenta ink (M), and the fading of the cyan ink (C) had the following relationship: Y>M>C.

The inks had the following lightness. Lightness;

Y: 88

M: 52

C: 46

In the formation of the image of a human being, the printing was carried out in the order from highest to lowest of fading of the inks, that is, in such a manner that the yellow ink was first deposited, the magenta ink was then deposited, and, finally, the cyan ink was deposited.

Example 2

The procedure of Example 1 was repeated to conduct printing, except that the order of printing of the inks was such that the cyan ink was first deposited, the magenta ink was then deposited, and, finally, the yellow ink was deposited.

Example 3

An ink jet printer MJ-930C (a printer used with inks of four colors of cyan, magenta, yellow, and black, manufactured by Seiko Epson Corporation) was provided. An image of a human being was printed on a specialty printing medium for ink jet recording (a specialty gloss film, manufactured by Seiko Epson Corporation) by means of this printer using the color ink set 1 and the black ink 1. For the inks constituting the color ink set 1 and the black ink 1, the cumulative average diameter of the pigment contained therein, the fading, and the lightness were as follows.

Cumulative Average Diameter:

Black pigment: 95 μm

Cyan pigment: 105 μm

Magenta pigment: 65 μm

Yellow pigment: 53 μm

The fading of the yellow ink (Y), the fading of the magenta ink (M), the fading of the cyan ink (C), and the fading of the black ink (K) had the following relationship: Y>M>C>K.

The inks had the following lightness.

Lightness:

Y: 88

M: 52

C: 46

K: 16

In the formation of the image of a human being, the printing was carried out in the order from highest to lowest of fading of the inks, that is, in such a manner that the yellow ink, the magenta ink, the cyan ink, and the black ink were deposited in that order.

Example 4

An ink jet printer PM-700C (a printer used with inks of six colors of cyan, magenta, yellow, black, light cyan, and light magenta, manufactured by Seiko Epson Corporation) was provided. An image of a human being was printed on a specialty printing medium for ink jet recording (a specialty gloss film, manufactured by Seiko Epson Corporation) by means of this printer using the color ink set 1, the black ink 1, and the color ink set 2. For the inks constituting the color ink set 1, the black ink 1, and the inks constituting the color ink set 2, the cumulative average diameter of the pigment contained therein, the fading, and the lightness were as follows.

Cumulative Average Diameter:

Black pigment: 95 μm

Cyan pigment: 105 μm

Magenta pigments 65 μm

Yellow pigment: 53 μm

Light cyan pigment: 105 μm

Light magenta pigment: 65 μm

The fading of the yellow ink (Y), the fading of the light magenta ink (Lm), the fading of the light cyan ink (Lc), the fading of the magenta ink (M), the fading of the cyan ink (C), and the fading of the black ink (K) had the following relationship: Y>Lm>Lc>X>C>K.

The inks had the following lightness.

Lightness:

Lm: 68

Lc: 63

M: 52

C: 46

K: 16

In the formation of the image of a human being, the printing was carried out in the order from highest to lowest of fading of the inks, that is, in such a manner that the yellow ink, the light magenta ink, the light cyan ink, the magenta ink, the cyan ink, and the black ink were deposited in that order.

Example 5

An ink jet printer PM-700C was provided. An image of a human being was printed on a specialty printing medium for ink jet recording (a specialty gloss film, manufactured by Seiko Epson Corporation) by means of this printer using the color ink set 1, the black ink 1, and the color ink set 3. For the inks constituting the color ink set 1, the black ink 1, and the inks constituting the color ink set 3, the cumulative average diameter of the pigment contained therein, the fading, and the lightness were as follows.

Cumulative Average Diameter:

Black pigment: 95 μm

Cyan pigment: 105 μm

Magenta pigment: 65 μm

Yellow pigment: 53 μm

Green pigment: 100 μm

Orange pigment: 88 μm

The fading of the yellow ink (Y), the fading of the orange ink (O), the fading of the magenta ink (M), the fading of the cyan ink (C), the fading of the green ink (G), and the fading of the black ink (K) had the following relationship: Y>O>M>C>G>K.

The inks had the following lightness.
Lightness:
Y: 88
O: 65
M: 52
C: 46
G: 44
K: 16

In the formation of the image of a human being, the printing was carried out in the order from highest to lowest of fading of the inks, that is, in such a manner that the yellow ink, the orange ink, the magenta ink, the cyan ink, the green ink, and the black ink were deposited in that order.

Example 6

An ink jet printer MJ-510 C was provided. An image of a human being was printed on a specialty printing medium for ink jet recording (a specialty gloss film, manufactured by Seiko Epson Corporation) by means of this printer using the color ink set 1. For the inks constituting the color ink set 1, the cumulative average diameter of the pigment contained therein, the fading, and the lightness were as follows.
Cumulative Average Diameter:

Cyan pigment: 30 μm

Magenta pigment: 110 μm

Yellow pigment: 53 μm

The fading of the yellow ink (Y), the fading of the cyan ink (C), and the fading of the magenta ink (M) had the following relationship: Y>C>H.

The inks had the following lightness.
Lightness:
Y: 88
C: 55
M: 42

In the formation of the image of a human being, the printing was carried out in the order from highest to lowest of fading of the inks, that is, in such a manner that the yellow ink was first deposited, the cyan ink was then deposited, and, finally, the magenta ink was deposited.

Comparative Example 1

In the same manner as Example 2, an ink jet printer MJ-930C was provided. An image of a human being was printed on a specialty printing medium for ink jet recording (a specialty gloss film, manufactured by Seiko Epson Corporation) by means of this printer using the color ink set 4 and the black ink 1. For the inks constituting the color ink set 1 and the black ink 1, the cumulative average diameter of the pigment contained therein, the fading, and the lightness were as follows.
Cumulative Average Diameter:

Black pigment: 95 μm

Cyan pigment: 105 μm

Magenta pigment: 51 μm

Yellow pigment: 115 μm

The fading of the magenta ink (M), the fading of yellow ink (Y), the fading of the cyan ink (C), and the fading of the black ink (K) had the following relationship: M>Y>C>K.

The inks had the following lightness.
Lightness:
M: 70
Y: 68
C: 46
K: 16

In the formation of the image of a human being, the printing was carried out in the order from lowest to highest of fading of the inks, that is, in such a manner that the black ink, the cyan ink, the yellow ink, and the magenta ink were deposited in that order.

Evaluation of Lightfastness

The images of human beings printed in Examples 1 to 5 and Comparative Examples 1 and 2 were allowed to stand outdoors for one month and exposed to direct sunlight. The images were then inspected for deterioration by 50 people in a wide range of ages. The results were reduced to four grades of A to D, and shown in Table 1.

A (very good or good): Less than 10 out of 50 people evaluated that the image was deteriorated.

B (practicable): 10 to less than 25 out of 50 people evaluated that the image was deteriorated.

C (fair): 25 to less than 40 out of 50 people evaluated that the image was deteriorated.

D (failure): 40 or more out of 50 people evaluated that the image was deteriorated.

TABLE 1

|  | Deterioration in image |
| --- | --- |
| Example 1 | A |
| Example 2 | B |
| Example 3 | A |
| Example 4 | A |
| Example 5 | A |
| Example 6 | B |
| Comparative Example 1 | D |

What is claimed is:

1. An ink set for ink jet recording, comprising two or more inks, the order from highest to lowest of fading of the inks being in the order from highest to lowest of lightness of the inks.

2. The ink set for ink jet recording according to claim 1, wherein said inks are a yellow ink, a magenta ink, and a cyan ink and the order from highest to lowest of lightness of the inks is a yellow ink, a magenta ink, and a cyan ink.

3. The ink set for ink jet recording according to claim 1, wherein said inks are a yellow ink, a magenta ink, a cyan ink, and a black ink and the order from highest to lowest of lightness of the inks is a yellow ink, a magenta ink, a cyan ink, and a black ink.

4. The ink set for ink jet recording according to claim 1, wherein said inks are a yellow ink, a light magenta ink, a light cyan ink, a magenta ink, a cyan ink, and a black ink and the order from highest to lowest of lightness of the inks is a yellow ink, a light magenta ink, a light cyan ink, a magenta ink, a cyan ink, and a black ink.

5. The ink set for ink jet recording according to claim 1, wherein said inks are a yellow ink, an orange ink, a magenta ink, a cyan ink, a green ink, and a black ink and the order from highest to lowest of lightness of the inks is a yellow ink, an orange ink, a magenta ink, a cyan ink, a green ink, and a black ink.

6. The ink set for ink jet recording according to claim 1, wherein said inks each contain a pigment as a colorant.

7. An ink jet recording method comprising the steps of: ejecting droplets of inks; and depositing the droplets onto a recording medium to perform printing, said inks being inks constituting the ink set according to claim 1.

8. The ink jet recording method according to claim 7, wherein the inks are deposited in the order from highest to lowest of fading onto the recording medium.

9. An ink jet recording head comprising nozzles arranged in the direction of movement of the recording head so that the inks are ejected in the order from highest to lowest of fading.

10. An ink jet recording apparatus comprising the ink jet recording head according to claim 9.

11. A recorded medium printed by the ink jet recording method according to claim 7.

12. A method for preparing an ink set for ejecting from an ink jet printer to form a color image on a recording medium, said method comprising (i) preparing at least first, second and third inks, the first ink comprising a first pigment as a colorant, the second ink comprising a second pigment as a colorant, and the third ink comprising a third pigment as a colorant, said first, second and third pigments being provided with respective diameters such that a fading of the first ink (Fa), a fading of the second ink (Fb) and a fading of the third ink (Fc) satisfy the following relationship:

Fa>Fb>Fc said first, second and third inks having lightnesses (La), (Lb) and (Lc) respectively that satisfy the following relationship La>Lb>Lc; and (ii) incorporating at least the first, second and third inks into the ink set.

13. The method according to claim 12, wherein the first, second and third pigments collectively comprise cyan, magenta and yellow pigments.

14. The method according to claim 13, wherein the first pigment is the yellow pigment, the second pigment is the magenta pigment and the third pigment is the cyan pigment.

15. The method according to claim 13, wherein the first pigment is the yellow pigment, the second pigment is the cyan pigment and the third pigment is the magenta pigment.

16. The ink set prepared by the method of claim 12.

17. The ink set prepared by the method of claim 13.

18. In a method for inkjet printing comprising the steps of (a) providing an ink set comprising at least yellow, cyan and magenta inks; and (b) depositing the inks onto a recording medium to form a color image thereon, wherein the image fades noticeably over time, the improvement comprising rendering any change in the image less noticeable by providing the ink set of claim 13 in step (a).

* * * * *